Feb. 27, 1968    W. S. WARREN ET AL    3,371,257
MOTOR CONTROLS FOR ELECTRO-MAGNETIC BASE TOOL
Filed Jan. 30, 1964    4 Sheets-Sheet 3
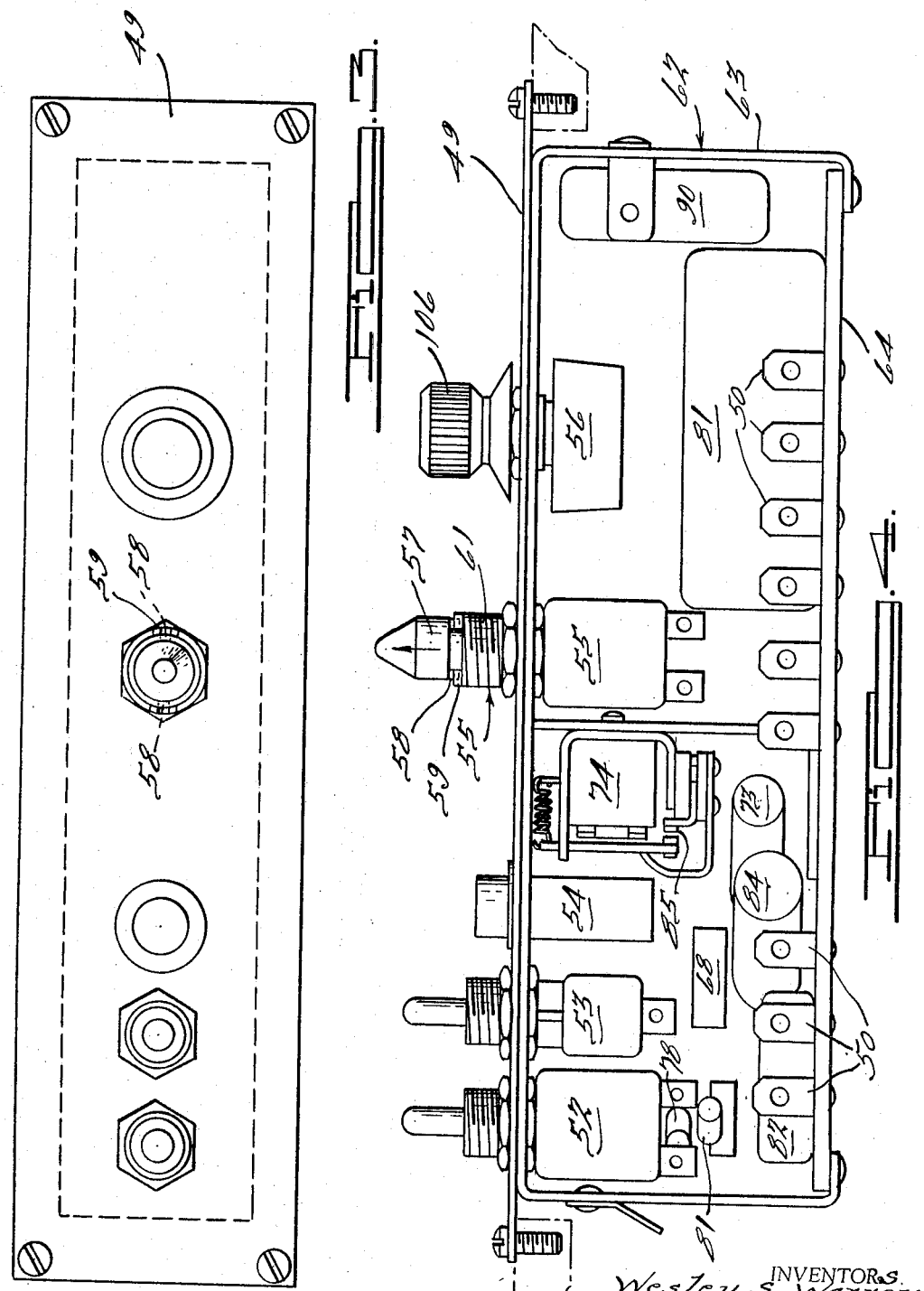
INVENTORS.
Wesley S. Warren
Ertman L. Kessler.
BY
James Dickey & Pierce
ATTORNEYS.

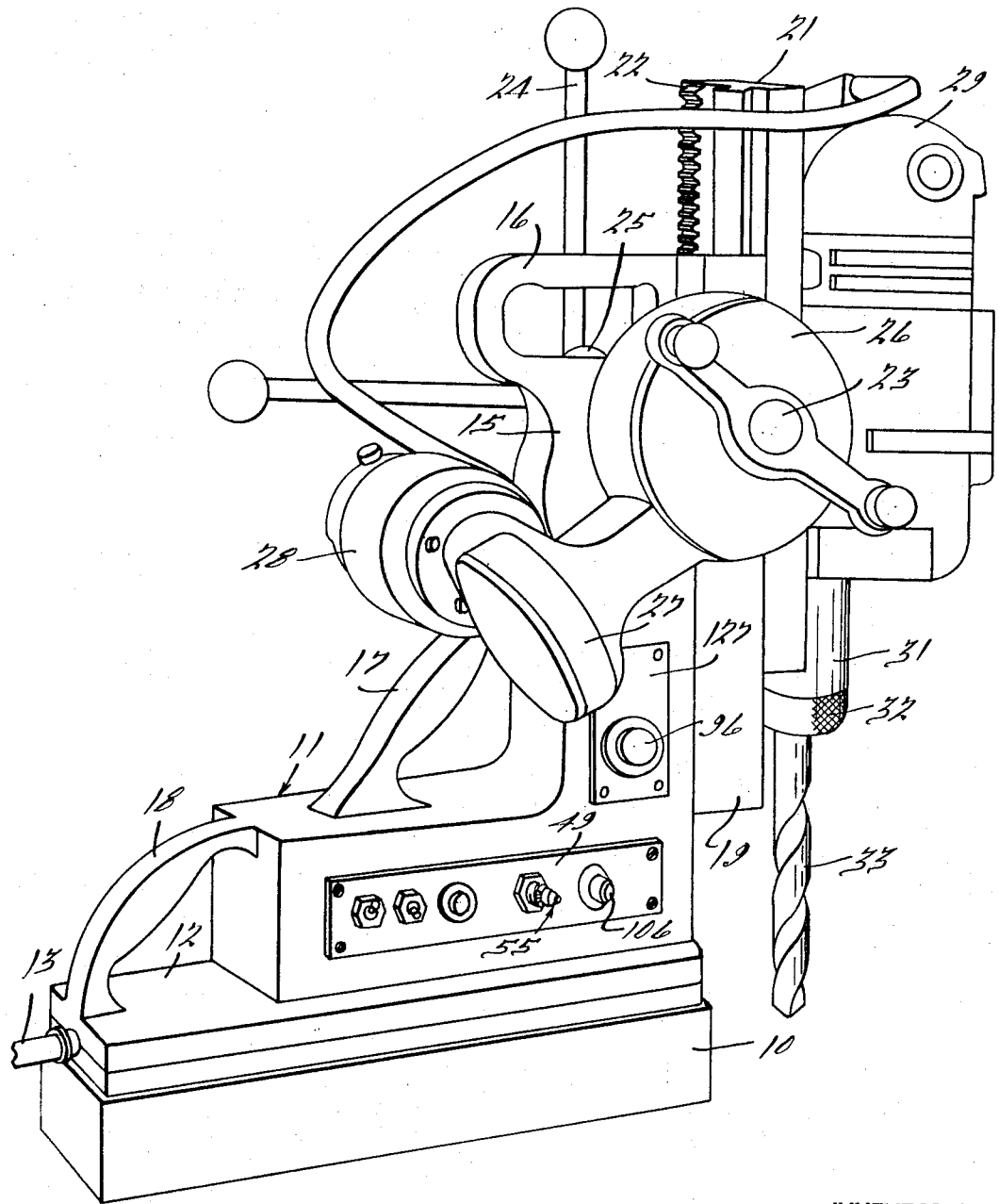

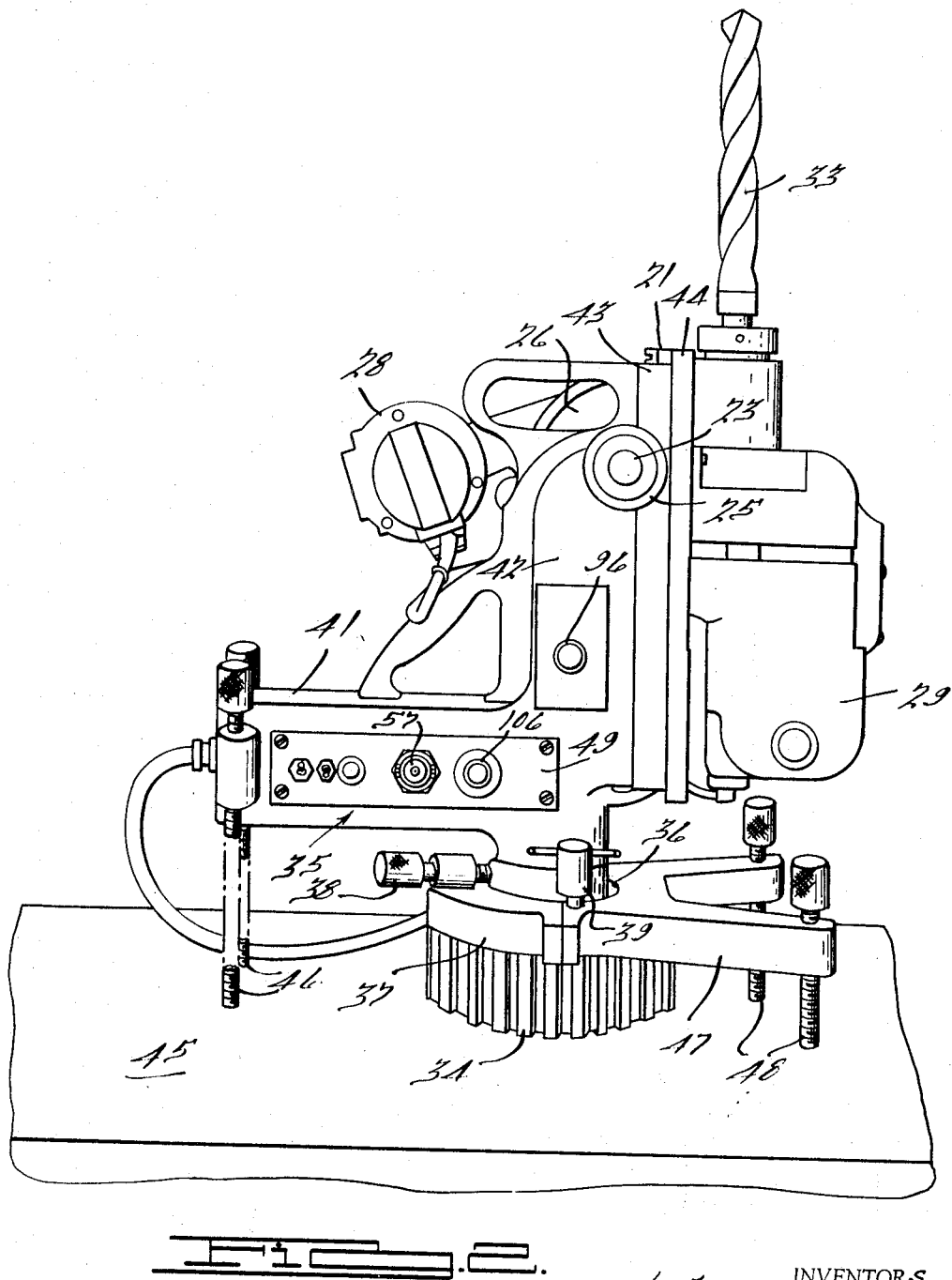

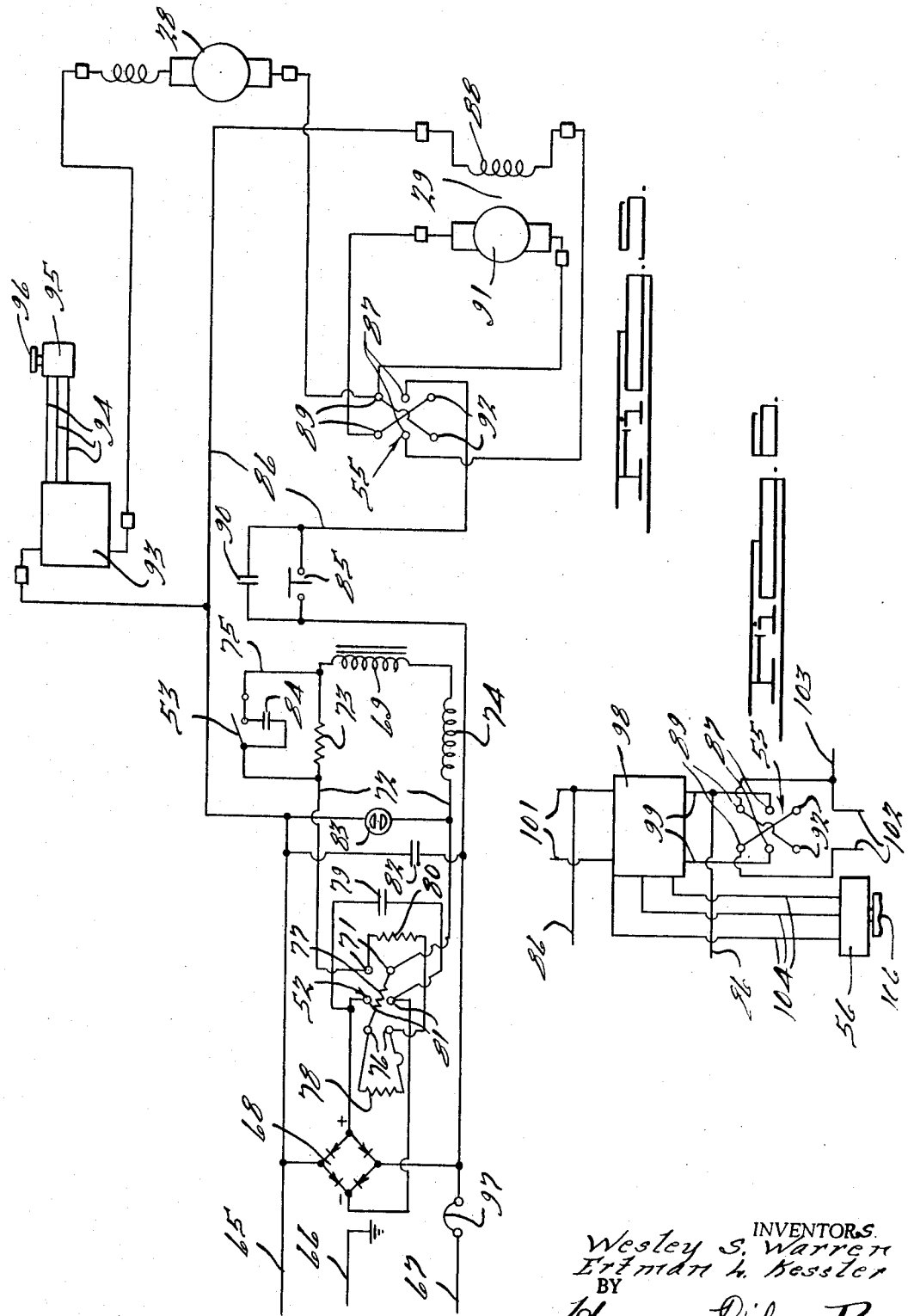

ered Feb. 27, 1968

United States Patent Office 3,371,257
MOTOR CONTROLS FOR ELECTRO-MAGNETIC BASE TOOL
Wesley S. Warren, Kalamazoo, and Ertman L. Kessler, Plymouth, Mich., assignors to General Automation Manufacturing, Incorporated, Troy, Mich., a corporation of Michigan
Filed Jan. 30, 1964, Ser. No. 341,363
11 Claims. (Cl. 318—39)

This invention relates to machining devices having a magnetic base and particularly to a machining device having a magnetizable base with a circuit for energizing the coil thereof and controlling the machining operation.

The device of the present invention has a base containing a magnetizable coil for holding the device to a member of magnetizable material. A hollow standard on the base supports a slide containing a motor for movement by rack and pinion drive elements. The pinion may be rotated by hand or by a motor for moving the slide as the tool is rotated. A package control circuit is mounted in a frame on a panel which covers an aperture in the standard through which the frame and package is insertable and retained in position when the panel is secured over the aperture to the wall of the standard. A first switch on the panel is movable to "on" and to "demagnetized" positions for energizing and deenergizing the magnetizable coil. A second switch on the panel is movable to a "high" and to a "low" position for regulating the degree of magnetism of the coil, the low position permitting the machining device to be adjusted for accurately locating the point of the tool relative to the point on the workpiece to be machined. After the tool is located, the switch is moved to "high" position to produce a maximum holding force for the device on the supporting member. A lamp on the panel is energized when the magnetic circuit is completed to indicate that a holding force is provided for the device. A third switch on the panel is movable from "off" to "on" and "reverse" positions for driving the motor in forward or reverse operation. This switch is preferably of a type to provide a safety factor for preventing the contacts from being moved instantaneously from "on" to "reverse" position. This is accomplished by a knife blade in a notch which requires the switch handle to be moved outwardly to move it from one position to another. A rheostat may be provided on the panel when the speed of the tool motor is to be controlled depending on the size of the tool and the hardness of the material being machined. When the speed of a feed motor is to be controlled, a second rheostat and power unit is employed in the circuit to the motor. The elements of the circuit are supported on a removable panel which may be replaced by a new unit and panel with very little loss of time to thereby maintain the device in operation while the defective unit is being repaired. The speed control circuits are simple and positive and provide universal use of the device by controlling the speed rotation of the tool motor as well as its advancement during the machining operation. By controlling these speeds, the unit may be employed for drilling, tapping, reaming, and other operations.

Accordingly, the main objects of the invention are: to provide a machine device having a magnetic base with a removable panel which supports elements of a circuit which are supported within the device when the panel is attached thereto; to provide a device with a panel having elements of a circuit when controls the holding magnet of the device, the operation of the tool motor carried by the device and the speed at which the motor is driven; to provide a motor carrying device with a magnet base and with speed control means for the tool motor and for a feed motor for advancing the first motor at a predetermined speed; to provide a device having a magnetic base with stabilizing arms extending beneath the tool motor which is mounted to move upwardly to machine a top element from a base having a surface made of magnetizable material, and in general to provide a panel for supporting elements of a circuit which is simple in construction, readily removed and replaced, and which is positive in controlling the operation of the device.

Other objects and features of novelty of the invention will be specifically pointed out or will become apparent when referring, for a better understanding of the invention, to the following description taken in conjunction with the accompanying drawings, wherein:

FIGURE 1 is a perspective view in elevation of a machine device having a magnetizable base and a panel supporting the elements of an electrical circuit embodying features of the present invention;

FIG. 2 is a view in elevation of a drilling device similar to that illustrated in FIG. 1, showing another form of the device;

FIG. 3 is an enlarged plan view of a panel which supports the electrical control and circuit elements of the devices illustrated in FIGS. 1 and 2;

FIG. 4 is a view in elevation of the structure illustrated in FIG. 3;

FIG. 5 is a view of a wiring diagram forming a complete circuit containing the elements illustrated in the structure of FIG. 4; and FIG. 6 is a wiring diagram covering the motor speed control circuit which is employed in the circuit of FIG. 5.

Referring to FIG. 1, the machine device of the present invention has a base 10 of magnetizable material containing a rectangular slot in the bottom in which a coil is embedded in epoxy or similar resin material. The coil when energized produces a magnetic holding force with a member of magnetizable material for retaining the device in position. When so held with the device of the size illustrated, a force of over 2,000 pounds can be applied to the tool end during the machine operation. A hollow frame 11 of aluminum or other material has a platform 12 which mates with and is secured to the base 10 in unit relation therewith. An extension cord 13 projects through a slot in the platform 12 from the rear end thereof into a hollow horizontal portion 14 which communicates with a hollow upright portion 15 having a handle 16 at its upper end. A handle 17 bridges the upright and horizontal portions and a handle 18 joins the horizontal portion 14 with the platform 12. The handle simplifies the carrying and the positioning of the device on a supporting base.

The forward face of the upright portion 15 has a dovetailed way 19 containing an adjustable gib which engages the dovetail of a slide plate 21 with an adjustable pressure. The slide plate carries a rack 22, the teeth of which mesh with the teeth of a pinion gear which is mounted on a shaft 23 on the frame 11. The pinion is operated manually by arms 24 extending from a hub 25 which is secured to the shaft. The pinion is also operated through a clutch within a housing 26 from a shaft and gears within a housing 27, which are driven by a motor 28. The slide plate 21 has a tool motor 29 secured to its forward face containing a shank 31 which carries an adjustable collet or morse taper spindle 32 which supports a tool, herein illustrated as a drill 33. When a hole is to be drilled, low current is first applied to the coil of the base 10 for holding the device in shiftable position and after adjustment, full current is applied to the coil to provide a maximum flux for holding the base in fixed position on the supporting member. Thereafter, the motor 29 is energized and the slide plate 21 moved downwardly either manually by the operation of the arms 24 or electrically through the operation of the motor 28 to perform the drilling operation.

In FIG. 2, a similar form of drill device is illustrated wherein a round base 34 contains the coil for producing the holding flux for securing the device on a member of magnetizable material. A frame 35 made of aluminum or other material is shiftable within an aperture 36 in a ring member 37 on the base 34 adjustable by a set screw 38 and clamped in adjusted position by a clamping screw 39. The frame 35 has a hollow horizontal portion 41 communicating with the hollow interior of an upright portion 42 which has a dovetail way 43 for supporting a dovetail slide plate 44. The slide plate carries a rack 21 having teeth in engagement with the pinion on a shaft 23 to which the hub 25 is attached. The shaft 23 also is engaged with a clutch within a housing 26 driven through a set of gears by a motor 28, as pointed out hereabove with regard to structure of FIG. 1. The drill motor 29 is illustrated as being inverted from the position illustrated in FIG. 1 so that the drill 33 can produce a hole in an upper member when the base 24 is supported on a table or platform 45 disposed therebelow. A pair of adjustable screws 46 is threaded on bosses at the rear end of the horizontal portion 41 and arms 47 projecting forwardly of the ring member 37 have screws 48 which stabilize the base directly beneath the drill motor 29. The operation of the device is the same as that referred to above with regard to the device illustrated in FIG. 1.

In FIG. 3, a panel 49 is illustrated which is secured to the horizontal portions 14 and 41 of the frames of the devices illustrated in FIGS. 1 and 2. The panel is secured in position by screws 51 and when these are removed the panel and the elements supported thereon are removable from the device. The panel has a plurality of contacts 50 which connect the circuits of the panel to the leads of the conductor 13 and to the elements of the drill press to be controlled thereby. The panel has a switch 52 which has an "off," an "on," and a "demagnetizing" position for magnetizing the coil of the base 10 when in "on" position and for demagnetizing the coil when in "demagnetizing" position and for disconnecting the coil when in the "off" position. A second switch 53 on the panel has two "on" positions, a "low" position, and a "high" position for providing low and high magnetism to the base 10. Adjacent to the switches, a lamp 54 is provided on the panel for indicating that the circuit to the base coil has been completed. A double-pole double-throw switch 55 on the panel 49 controls the driving of the motor 29 for producing a machine operation and a reverse position after the machine operation has been performed. Additionally, the panel may be provided with a potentiometer 56 when the speed of the tool motor 29 is to be controlled. The switch 55 has an operating knob containing knife blades 58 which engages a V-notch 59 on the collar 61 of the switch. The element 57 must be pulled outwardly before it can be moved to either On or Reverse positions so as to produce a time delay in the movement of the knob from On to Reverse position to prevent damage to the motor windings. The panel 49 has a bracket 62 secured thereto with arms 63 extending rearwardly thereof to the ends of which an insulating panel 64 is secured. The switches and other elements employed in the circuit are supported within the bracket 62 and panel 64 as will be more specifically described with relation to the wiring diagram illustrated in FIGS. 5 and 6.

A source of alternating current is illustrated by the leads of the extension cord 13. The lead 66 is connected to ground while a diode 68 is connected across the leads 65 and 67. This provides a single-phase full wave bridge type of circuit which changes the alternating current to direct current of sufficient voltage to induce magnetic lines of force in the coil 69 in the magnetic base 10. The direct current is passed to the coil 69 in two different intensities depending upon the position of the switch 53. When the switch 53 is at "low" position, with the switch 52 bridging contacts 71, a circuit 72 is completed through a resistor 73, the coil 69 and through the coil 74 of a current sensitive relay. For the particular coil 69 illustrated in the diagram, the resistor 73 is of approximately 2000 ohms, 10 watt capacity. A shunt circuit 75 is provided about the resistor 73 in which the single pole, single throw switch 53 is in series and across the contacts of which a capacitor is provided of .05 microfarad at 600 volts DC. When the switch 52 is operated to bridge the contacts 71 and the switch 53 is in open position, the resistor 73 in the circuit limits the amount of magnetic flux produced in the base 10 thereby permitting the operator to adjust the position of the base of the device in relation to the point at which the aperture is to be drilled. After the base is located in this manner, the switch 53 is moved to closed position, shunting out the resistor 73, so that full current is applied to the coil 69 creating maximum magnetic flux density in the coil with resulting full holding power of the base on its support. When the operator desires to release the drilled unit from the support, the switch 52 is moved to engage contacts 76 to "demagnetizing" position, and the current from the diodes 68 flows in the reverse direction in the coil 69 and the magnetic field collapses and residual magnetism is all that retains the base 10 on its support. A resistor 77 is disposed in series in the circuit 72 from one of the contacts 76 for limiting the current flow to the coil 69 and prevent full magnetism in the reverse direction of current flow. In the example illustrated, the resistor 77 is of 1,000 ohm, 1 watt capacity. A resistor 78 of 15,000 ohms at 10 watt capacity is shunted across the contacts 76 to prevent sparking the contacts. A resistor 80, of the same capacity as the resistor 77 is shunted across one of the contacts 76 and of the contacts 71 of the switch 52. A capacitor 79 of 100 microfarads 250 volts DC capacity is shunted across the main contacts 81 of the switch 52 to which the leads from the diode 68 is connected for the purpose of protecting the diode from transient circuits. A capacitor 82 of .01 microfarad 600 volt capacity is connected across the leads 65 and 67 which protects the motor 69 in circuit therewith from main line transient currents. A lamp housing 83 is connected to one lead of the circuit 72 and to the lead 65 for energizing the lamp 54 supported by the housing when the coil 69 of the base 10 is energized. A capacitor 84 of .05 microfarad 600 volt DC capacity is shunted across the contacts of the switch 53 to protect the contacts when the switch is operated. Contacts 85 of the relay having the coil 74 in the circuit 72 will only close when current is being provided to the coil 69. The contacts 85 are shunted by a capacitor 90 of .1 microfarad 600 volt DC rating. Since the contacts 85 control a circuit 86 to the drill motor 29, the motor cannot be operated when the base 10 is not magnetized. When the bridging elements of the terminals 87 of the switch 55 engage the contacts 89, the circuit 86 is in series with the field coil 88 and the armature 91 of the drill motor 29 to drive the armature in the forward direction. When the switch 55 is thrown to engage the contacts 92, the current is reversed through the armature 91 and the field coil 88 thereby reversing the operation of the motor 29. When the switch 55 is operated to either forward or reverse positions, the feed motor 28 is energized and, as herein illustrated, is disposed in series with a power unit 93, which is connected by conductors 94 to a potentiometer 95. By adjusting a knob 96 of the potentiometer 95, the speed of operation of the motor 28 and the advancement of the tool is controlled. A thermal relay 97 may be provided in the lead 67, the one here illustrated is rated to open at 250° F. and to close at 200° F. Should the voltage to the coil 69 fall too low for safe-holding power of the magnetic base 10, the holding force of the coil 74 weakens and the contacts 85 open the circuit to the motors 29 and 28 thereby minimizing the possibility of severe damage to the unit by not having the magnetic base firmly attached to its support. With the switch 55 in series with the circuit of the relay contacts 85, the operator is able to manually stop and reverse the drill motor 29. The thermal operated circuit breaker 97 protects the unit from possible damage in case the temperature exceeds safe limits of the insulating material and other related components. The light 83, which may be of a neon type, indicates that the coil 69 is energized through the operation of the switch 52. When the neon lamp is not operated and the power cord is plugged in and the unit is resting on its supporting base, an indication is provided to the operator that only residual magnetism is holding the unit on its support and that the switch 52 should be actuated before the drill motor 29 can be operated. This protection is provided by the relay contacts 85, the coil of which is in series with the coil 69 of the base 10. A further safety feature of the unit is provided by the residual magnetism remaining in the base 10 when all the power is off which is sufficient to hold the entire assembly to the base support until it can be removed by the operator.

It is to be understood that in the diagram of FIG. 5 the feed motor 28, power unit 83 and the potentiometer 95 may be omitted from the circuit and is omitted when manual feed is employed for advancing the motor 29 during the machining operation. Similarly, in the circuit of FIG. 5, no provision is made for the speed control of the drill motor 29. The circuit providing this control is illustrated in FIG. 6 which circuit readily connects within the circuit of FIG. 5. In this arrangement, a power unit 98 has a pair of leads 99 connected to the main terminals 87 of the switch 55 and a pair of leads 101 connected across the field coil 89 of the drill motor 29. The contacts 89 of the switch are connected by leads 102 to the armature 91 of the drill motor 29 with a conductor 103 connected to the armature of the feed motor 28. Conductors 104 from the power unit 98 connect to a potentiometer 105 controlled by a knob 106. The potentiometer 105 can be adjusted to reduce the driving speed of the motor 29 to substantially 30 r.p.m. from which it is increased to full speed.

The power units 93 and 98 referred to hereinabove may be of any type known in the art to be suitable for controlling the speed of the motors. The ones employed in the circuits of FIGS. 5 and 6 are of the solid state energy control type which are extremely compact and which have proven very successful. The units are obtainable from the Lear Jet Corporation, whose address is Municipal Airport, P.O. Box 1280, Wichita, Kans. The unit 93 bears Serial No. 2–2004 and is of the full wave type which was found to provide smooth starting characteristics controlled entirely by the potentiometer, the operating speed of the motor being unaffected by change in load requirement. The power unit 98 bears Serial No. 2–2002 and is of the half-wave type and was designed to control universal shunt motors. The unit features a feed-back control circuit which automatically varies the energy supplied to the motor to maintain a selected speed regardless of changing load on the motor. The motor operates on a speed as low as 30 r.p.m. to maximum speed and is useful where the load on the motor varies greatly and where it is desirable to maintain a smooth constant speed from "no load" to "full load." The units 93 and 98 are secured to the inner wall of the horizontal and upright portions of the castings 11 and 35. The potentiometer 95 is mounted on a panel 127 which is removably secured over an aperture in the upright portion 15 of a casting 11 with a knob 96 in position to adjust the potentiometer.

We claim:

1. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, a double pole double throw switch on said panel, a rectifying diode unit supported by said panel and connectible to a source of AC current and in circuit with said switch and said magnetic coil for applying the DC current for magnetizing and demagnetizing the coil when the switch is in the one or the other position, a relay supported by said panel having its coil in series with the magnetizable coil and its contacts in the motor circuit which can be operated only when the magnetizable coil is energized, a double throw double pole switch on said panel in the circuit from said relay contacts for reversing the drive of the motor, a resistor in series with magnetizable coil, a single pole single throw switch on said panel for shunting said resistor to permit the coil to be fully magnetized, a potentiometer on said panel, and a power unit in the circuit from the relay contacts controlled by said potentiometer for regulating the speed of operation of the motor.

2. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, a double pole double throw switch on said panel, a rectifying diode unit supported by said panel and connectible to a source of AC current and in circuit with said switch and said magnetic coil for applying the DC current for magnetizing and demagnetizing the coil when the switch is in the one or the other position, a relay supported by said panel having its coil in series with the magnetizable coil and its contacts in the motor circuit which can be operated only when the magnetizable coil is energized, a double throw double pole switch on said panel in the circuit from said relay contacts for reversing the drive of the motor, a resistor in series with magnetizable coil, a single pole single throw switch on said panel for shunting said resistor to permit the coil to be fully magnetized, a potentiometer on said panel, a power unit in the circuit from the relay contacts controlled by said potentiometer for regulating the speed of operation of the motor, said vertical portion of the housing having an aperture, a panel for enclosing said aperture, a potentiometer on said panel, a feed mechanism for advancing the slide and a motor for driving said feed mechanism, and a power unit controlled by said potentiometer for controlling the speed of said feed motor and the advancement of said slide.

3. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, a double pole double throw switch on said panel, a rectifying diode unit supported by said panel and connectible to a source of AC current and in circuit with said switch and said magnetic coil for applying the DC current for magnetizing and demagnetizing the coil when the switch is in the one or the other position, a relay supported by said panel having its coil in series with the magnetizable coil and its contacts in the motor circuit which can be operated only when the magnetizable coil is energized, a double throw double pole switch on said panel in the circuit from said relay contacts for reversing the drive of the motor, a resistor in series with magnetizable coil, a single pole single throw switch on said panel for shunting said resistor to permit the coil to be fully magnetized, a potentiometer on said panel, a power unit in the circuit from the relay contacts controlled by said potentiometer for regulating the speed of operation of the motor, said vertical portion of the housing having an aperture, a panel for enclosing said aperture, a potentiometer on said panel, a feed mechanism for advancing the slide and a motor for driving said feed mechanism, a power unit controlled by said potentiometer for controlling the speed of said feed motor and the advancement of said slide, said slide being moved upwardly to perform a machine operation, and means extending from said base beneath said slide for stabilizing said base.

4. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, switch means on said panel, a rectifying diode unit supported by said panel and connectible to a source of AC current and in circuit with said switch means and said magnetic coil for applying the DC current for magnetizing and demagnetizing the coil when the switch means is in the one or other position, a relay mounted by said panel having its coil in series with the magnetizable coil and its contacts in the motor circuit which can be operated only when the magnetizable coil is energized.

5. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, a double pole double throw switch on said panel, a rectifying diode unit supported by said panel and connectible to a source of AC current and in circuit with said switch and said magnetic coil for applying the DC current for magnetizing and demagnetizing the coil when the switch is in the one or other position, a relay supported by said panel having its coil in series with the magnetizable coil and its contacts in the motor circuit which can be operated only when the magnetizable coil is energized, and a double throw double pole switch on said panel in the circuit from said relay contacts for reversing the drive of the motor.

6. In a machine tool having a magnetic base, a magnetic coil for said base, a hollow housing having horizontal and vertical portions supported on said base, a movable slide on the vertical portion of said housing, a motor for supporting a tool on said slide, said horizontal portion having an elongated aperture through a wall thereof, a removable panel for enclosing said aperture, a double pole double throw switch on said panel, a rectifying diode unit supported by said panel and connectible to a source of AC current and in circuit with said switch and said magnetic coil for applying the DC current for magnetizing and demagnetizing the coil when the switch is in the one or other position, a relay supported by said panel having its coil in series with the magnetizable coil and its contacts in the motor circuit which can be operated only when the magnetizable coil is energized, a double throw double pole switch on said panel in the circuit from said relay contacts for reversing the drive of the motor, a resistor in series with magnetizable coil, and a single pole single throw switch on said panel for shunting said resistor to permit the coil to be fully magnetized.

7. In a portable drill having a housing containing a coil for magnetizing a base and a motor for rotating a drill, means for driving said motor in rotation, means for moving the drill toward and away from a workpiece, said housing having an opening into a hollow interior, a panel for closing said opening, rectifier means on said panel for changing an AC current to a DC current, means on said panel for connecting the output portion of the rectifier means to said coil, means for releasably supporting the panel on said housing over the opening with the elements thereon disposed within the hollow interior, switch means on said panel, and conducting means on said panel connected to said rectifier means and to said switch means for delivering an AC current to the input portion of the rectifier means.

8. In a portable drill as recited in claim 7, wherein said rectifier means is a diode means.

9. In a portable drill as recited in claim 7, wherein potentiometer means is mounted on the panel for regulating the speed of said motor.

10. In a portable drill as recited in claim 7, wherein resistor means is provided on the panel, and switch means on the panel in circuit with the resistor means and the coil for reducing the holding force of the magnetizable base.

11. In a portable drill as recited in claim 7, wherein relay means is so connected to the conducting means as to interrupt the circuit to the motor when the coil is de-energized.

References Cited

UNITED STATES PATENTS 1,301,966   4/1919   Parkhurst et al. _____ 318—39
2,466,355   4/1949   Baker _____ 318—446 X
2,887,911   5/1959   Bunting.

FOREIGN PATENTS 700,472   12/1953   Great Britain.

ORIS L. RADER, *Primary Examiner.*

THOMAS LYNCH, *Examiner.*